United States Patent

Franklin

(10) Patent No.: US 10,271,030 B1
(45) Date of Patent: Apr. 23, 2019

(54) GENERATING A MONOCHROME IMAGE

(71) Applicant: Raytheon Company, Waltham, MA (US)

(72) Inventor: Craig R. Franklin, McKinney, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/721,415

(22) Filed: Sep. 29, 2017

(51) Int. Cl.
H04N 5/232 (2006.01)
H04N 5/33 (2006.01)
H04N 9/70 (2006.01)
G06T 3/40 (2006.01)

(52) U.S. Cl.
CPC ............ *H04N 9/70* (2013.01); *G06T 3/4015* (2013.01); *H04N 5/23293* (2013.01); *H04N 5/332* (2013.01)

(58) Field of Classification Search
CPC ...... H04N 9/70; H04N 5/23293; H04N 5/332; G06T 3/4015
See application file for complete search history.

(56) References Cited

U.S. PATENT DOCUMENTS

| | | | |
|---|---|---|---|
| 5,652,621 A | 7/1997 | Adams, Jr. et al. | |
| 7,911,517 B1 | 3/2011 | Hunt, Jr. et al. | |
| 2006/0082592 A1* | 4/2006 | Black-Ziegelbein | G06T 11/206 345/605 |
| 2008/0143844 A1 | 6/2008 | Innocent | |
| 2010/0110238 A1* | 5/2010 | Kang | H04N 9/045 348/242 |
| 2011/0176726 A1* | 7/2011 | Lee | H04N 1/40012 382/163 |
| 2011/0235855 A1* | 9/2011 | Smith | G06F 3/0304 382/103 |
| 2014/0267351 A1 | 9/2014 | Klaus et al. | |
| 2015/0109323 A1 | 4/2015 | Johnson et al. | |
| 2015/0248590 A1* | 9/2015 | Li | G06K 9/00785 382/103 |

OTHER PUBLICATIONS

International Search Report for International Application No. PCT/US2018/044256 dated Oct. 4, 2018, 15 pages.

* cited by examiner

*Primary Examiner* — Hung H Lam (57) ABSTRACT

Systems and methods are described for generating a monochrome image from a color filter array. Image data from an image capturing device may be received having a color filter array comprising a plurality of filter positions. The image data may be interpolated to de-mosaic the image data into three sets of data representing red, blue, and green (RGB) data, respectively, for each of the plurality of filter positions. A weight may be calculated for each value of the RGB data based on a local gradient calculated for each value of the RGB data. A pixel value may be calculated for each pixel position for generating a monochrome image using the weight for each value of the RGB data.

21 Claims, 6 Drawing Sheets

| G1 | R2 | G3 | R4 | G5 |
|----|----|----|----|----|
| B6 | G7 | B8 | G9 | B10 |
| G11 | R12 | G13 | R14 | G15 |
| B16 | G17 | B18 | G19 | B20 |
| G21 | R22 | G23 | R24 | G25 |

GENERATING A MONOCHROME IMAGE

BACKGROUND

An image capturing device, such as a camera, may be used to capture an image of an object. The image capturing device may capture a digital image of the object. The image may be used to produce video of the object. The image resulting from the image capturing device may be a color image or a monochrome image. In examples where a color image is captured, the resulting color image may have a reduced sharpness due to the use of a color filter. In some instances, it may be desirable to convert the color image to a monochrome image. This can be accomplished, in one technique, for example, where color video is converted to monochrome by simply stripping the chroma at the final stage of processing. However, such a technique may limit overall performance because of how the blue and red channels are typically weighted in the final luma product. For example, a monochrome video converted from a color video using this technique may result in the same or similar modulation transfer function (MTF) as the color video.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

An image capturing device may employ sensors or photosensors to capture an image. For example, the photosensors may be single-chip digital image sensors. In order to capture a color image using single-chip digital image sensors, the image capturing device may employ a color filter array such as a Bayer filter mosaic. The color filter array may be a hardware device that is built into the image capturing device over the image sensors. In one aspect, the color filter array decreases the sharpness or MTF of a color image resulting from an image capturing device with a color filter array as compared to a monochrome image resulting from the use of the image capturing device operating without the color filter array. It may be desirable to capture a monochrome image with a higher MTF as compared to a color image with a decreased MTF or sharpness without removing the color filter array from the image capturing device.

The present technology operates to generate a monochrome image using an image capturing device with a color filter array. The resulting monochrome image may be generated with an image quality or MTF that is greater than the MTF of a color image captured by the same image capturing device with the color filter array. The present technology may operate without employing multi-chip image capturing devices and without physically removing the color filter array from the image capturing device. Thus, the present technology may advantageously be applied to existing image capturing devices with color filter arrays. Therefore, the existing image capturing device may be employed to generate monochrome images and color images where the monochrome images have an increased MTF compared to the color images.

In one aspect, the present technology may operate using an image capturing device with a color filter array and with single-chip digital image sensors. The first step may be to capture image data of an object and then remove all color correction and white balance applied to the image data for color fidelity. The second step may be to utilize inter channel information for reconstruction of R'G'B' data. The third step may be applying noise reduction to each channel. The fourth step may be generating a luma signal by combining different ratios of the three channels in a spatial adaptive manor. Thus, the present technology may produce the highest MTF product possible from the interpolated channel data for an image capturing device with a color filter array. This may be described as a technique that constructs a new monochrome image from raw color filter array sensor data and not as a technique that converts a color image to a monochrome image.

Figure 1:
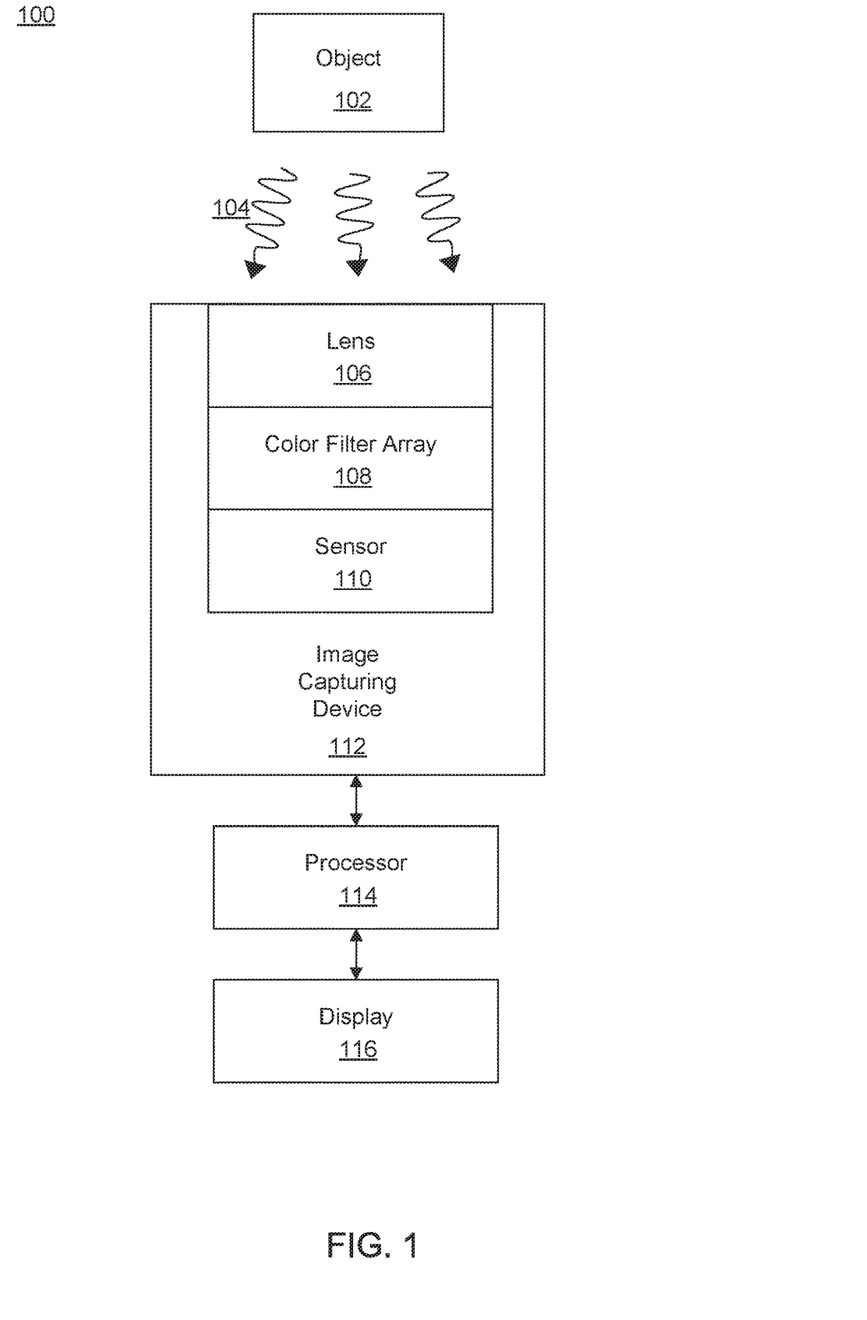
FIG. 1 is a block diagram illustrating an example of a system for generating a monochrome image according to embodiments of the present technology.

To further describe the present technology, examples are now provided with reference to the figures. FIG. 1 illustrates a system 100 and a method that is provided to generate a monochrome image using an image capturing device 112. This system and method will be explained in terms of an example of capturing an image of an object 102. The monochrome image may be generated based on raw data gathered by a sensor 110.

In one aspect, the image capturing device 112 is a device that is capable of capturing or generating an image of the object 102. For example, the image capturing device 112 may be a camera, digital camera, camcorder, scanner or other device capable of generating a digital image of the object 102. The image capturing device 112 may be an off the shelf device, or a proprietary or custom device. The image capturing device 112 may employ a lens 106 to focus light 104 that is reflected off of, or that is originating from the object 102. The lens 106 may be a series of lenses or a single lens. The lens 106 may be replaced or interchanged with another lens. The light 104 may be visible light or may be other forms of electromagnetic radiation such as infrared or ultra violet.

The image capturing device 112 may further comprise a color filter array 108 operable with the sensor 110. The light 104 may be focused by the lens 106 onto the color filter array 108 or may be focused onto the sensor 110, such that the light 104 passes through the color filter array 108 before impinging on the sensor 110. The color filter array 108 may be any type of color filter array 108 and may be designed to generate a color image of the object 102. For example, the sensor 110 may be used to generate a monochrome image of an object, but when the image capturing device 112 combines the sensor 110 with the color filter array 108, the image capturing device 112 may generate a color image of the object 102. The image capturing device 112 may be in use in the field with the sensor 110 already combined with the color filter array 108. Removing the color filter array 108 may require removing the image capturing device from the field and would prevent the image capturing device from capturing color images. The sensor 110 may be a single sensor or an array of sensors. The sensor may be arraigned in a square grid. The sensor 110 may be a photosensor such as a semiconductor charge-coupled device (CCD), a complementary metal-oxide-semiconductor (CMOS), an N-type metal-oxide-semiconductor (NMOS, Live MOS), or other sensor for capturing image data. The sensor 110 may be a single-chip digital image sensor.

In one aspect, the color filter array 108 is a Bayar filter. A Bayer filter may be described as a Bayar filter mosaic that is a color filter array for arranging red, green, and blue (RGB) color filters on a square grid of photosensors, such as the sensor 110. In one aspect, the filter pattern of a Bayar filter is 50% green, 25% red and 25% blue, and may be referred to as BGGR, RGBG, GRGB, or RGGB. It should be appreciated that color filters other than Bayar filters may be employed with the present technology. Employing the color filter array 108 to generate a color image may cause the sensor 110 or a portion of sensors associated with the image capturing device 112 to capture the object 102. For example, if the object 102 is a red car, and 25% of the sensor 110 is covered with red filters for the color filter array 108, then only 25% of the sensor 110 will capture image data for the red car. This leads to a decrease in image data that may be sampled or received by the sensor 110 for the object 102. A multi-chip sensor may be relied upon to gather more data for the object 102. However, the image capturing device 112 may be built with a single-chip design and may not be easily converted to a multi-chip design. The present technology may be implemented with single-chip design image capturing devices that are in use in the field without requiring the image capturing device to be converted to a multi-chip design.

The sensor 110 may generate image data for generating an image of the object 102. The image data may be sent to a processor 114 to generate an image of object 102. The processor 114 is capable of processing the image data using the techniques of the present technology to generate a monochrome image of the object 102 using the color image data from the sensor 110 and the color filter array 108 where the monochrome image has an increased MTF compared to a color image generated by image data. The image can be displayed on a display 116. In one aspect, the processor 114 can comprise a component of the image capturing device 112 and can be housed in the same housing as the sensor 110. In another aspect, the processor 114 can be attached or coupled to the image capturing device 112. In another aspect, the processor 114 can be located physically remote from the image capturing device 112, with the image data from the sensor 110 being sent to the processor 114 using either wired or wireless communications. For example, the image data may be sent to the processor 114 over a network. The display 116 can be physically coupled or attached to either the image capturing device 112 or the processor 114. The display 116 can be located physically remote to either the image capturing device 112 or the processor 114. The display 116 can be a liquid crystal display (LCD), a light-emitting diode (LCD) display, a cathode ray tube (CRT) display, or any other display capable of displaying an image.

In one aspect, the processor 114 is employed to implement a multi-step process using image data from the sensor 110 to generate a monochrome image. The image capturing device 112 may initially be employed to capture image data via the sensor 110. The image data may be color image data due to the use of the color filter array 108. The image capturing device 112 may comprise an infrared (IR) filter to filter out data from the sensor 110 that pertains to IR light. For example, the IR filter may be a clear or a vis-cut filter. The IR filter may also be described as a high pass filter that cuts off wavelengths below 850 nm. In one aspect, the processor 114 may include IR data. This may be accomplished by operating the image capturing device 112 without the IR filter. This ensures that the most data possible is received by the processor 114 from the sensor 110. In other words, the present technology does not make assumptions about the spectrum of data that is received by the sensor 110, and instead all data received by the sensor 110 is analyzed to generate a monochrome image.

The image data from the sensor 110 may be mapped or oriented such that the data may correspond to pixels to be displayed for the image. For the light 104 that has passed through the color filter array 108, this may be described as the image data having a filter position or a sensor position. For example, the sensors for sensor 110 can employ a grid pattern with each sensor in the grid having a position described as a filter position or sensor position. The image data can be color image data due to the use of the color filter array 108.

Next, the processor 114 can apply a recursive filter to the image data from the sensor 110. This may be described as noise reduction, de-noising, or frame integration. The recursive filter can be applied to the image data for each filter position. This step can employ standard techniques for noise reduction and can be optionally applied for various implementations of the present technology.

Next, the processor 114 can subtract a black level from the image data. This step can employ standard techniques for black level reduction. The techniques for black level reduction can be the same techniques employed for color image processing. This step can be optionally applied for various implementations of the present technology.

Next, the processor 114 can bypass white balancing the image data. White balancing may be described as a per color RGB gain. Mite balancing can be employed for processing a color image with an IR cut filter for color fidelity. In one aspect, the present technology results in a monochrome image and thus a white balancing step may not be required and can be bypassed.

Next, the processor 114 can calculate a new global gain per each filter position of the image data. The new global gain can then be applied to the data associated with each filter position for the image data. The new global gain can useful when the object 102 is composed mostly of one color, such as a blue ocean or a green forest. In one aspect, a technique for calculating the new global gain can include calculating the gray shade for each color RGB. The gray shade can be calculated at the widest point which may be 99%. The remaining 1% of the data may be the brightest spots or may be dead pixel data. The gray shade can be calculated by analyzing all of the image data and measuring the peak for each of the three colors RGB. The peaks can be used to create a histogram. The maximum value for each of RGB can then be calculated using the gray shade. The new global value can then be calculated by dividing the maximum value by the maximum value for each of RGB. This technique for calculating the new global value is outlined by equations 1-5. This technique can be employed to maximize a response in each channel of RGB and can be applicable to a monochrome image because fidelity of color is not important.

Red_Max=Grayshade at 99% of red pixel count     Equation 1

Green_Max=Grayshade at 99% of green pixel count     Equation 2

Blue_Max=Grayshade at 99% of blue pixel count     Equation 3

Max_Value=Max(Red_Max,Green_Max,Blue_max)     Equation 4

Gain_Per_Color=Max_Value/{Ret_max,Green_Max, Blue_Max}     Equation 5

In one aspect, calculating the new global gain can improve edge restoration in color interpolation (de-mosaicing) and provide the best possible MTF for the monochrome image. In one aspect, the new global gains will vary for spectral content of the scene captured by the image capturing device 112.

Next, the processor 114 can de-mosaic the image data with the new global gains applied into three sets of data representing RGB data. For example, image data pertaining to each of the filter positions corresponding to each of the three colors RGB for the color filter array 108 can be de-mosaiced. This step may employ standard techniques for color interpolation. In one aspect, advanced color plan interpolation (ACPI) is the technique employed for de-mosaicing.

Next, the processor 114 can reduce the spatial noise for the RGB data. The spatial noise reduction can be accomplished by performing a median operation for the three sets of RGB data. This may be described as a local area median filter. Data resulting from the spatial noise reduction of the three sets of RGB data can be referred to as R'G'B' data or pseudo RGB data which also includes three sets of data derived from the three sets of RGB data. In one aspect, the median operation is a 3×3 median passed over each of the three sets of RGB data. It should be appreciated that other sized median operations can be employed such as a 5×5 median. This step can be used as a temporary calculation and may not modify a position of pixel data for the resultant monochrome image. The spatial noise in the image may have been caused by applying the new global gain and is therefore reduced in this step. The R'G'B' data can calculate a true local value.

Next, the processor 114 can calculate a local gradient for each of the three sets of R'G'B' data. The local gradients can be produced by subtracting the Max and Min in the 3×3 area of median values for each filter position. This step can be employed to find contrast in each of the three colors. This step is performed rather than averaging data for each color. In real world images different objects within the image have different colors. This step ensures that contrast within the image is accounted for.

Next, the processor 114 can calculate a weight for each filter position of the three sets of RGB data based on the local gradient calculated in the preceding step. These weights can be referred to as pixel weights. In one aspect, the weight for each color is calculated by dividing the color gradient by a total gradient. This step ensures that a color is dominant in a position where it should be for the monochrome image. The dominant color can drive down the other two colors in that position. In one aspect, if no high frequency signal is present in a given filter position, the weights can be equal for the given filter position. The weights can be calculated using equations 6-8:

Red_weight=Red_gradient/Total_gradient     Equation 6

Green_weight=Green_gradient/Total_gradient     Equation 7

Blue_eight=Blue_gradient/Total_gradient     Equation 8

Next, the processor 114 can calculate a pixel value for each pixel position in a monochrome image. The pixel position can be one of a plurality of pixel positions that are positioned as an array across the senor 110. The pixel values can be calculated using the weights calculated in the step above. The pixel out value for a given pixel position may be equal to the red weight plus the green weight plus the blue weight calculated for filter position for each of the three colors. This calculation is described in equation 9:

Pixel_out=(Ret_weight*R')+(Green_weight*G')+(Blue_weight*B')     Equation 9

The pixel values for the monochrome image can be sent or outputted to the display 116. The display 116 can then display the monochrome image. Thus, the present technology is employed to generate a monochrome image using raw sensor data from the sensor 110. The monochrome image generated by the present technology can have an increased sharpness, resolution or MTF compared to a color image generated using the same image data from the sensor 110.

The term pixel as used in this description can include any type of picture element or image sub-element that represents an intensity and/or color value. While a pixel can map directly to a physical capture element of an image sensor or a physical output element on a display (e.g., a display pel), a one-to-one mapping between the physical capture or display elements and the mathematical pixels may not always be used. The present technology can be described as a process that adapts to the spectral content of the current scene captured by the image capturing device 112. In one aspect, the process automatically balances data for each pixels response to ensure the best MTF from the color de-mosaicing. In one aspect, the process uses a spatially adaptive algorithm to convert the resulting RGB image into an intensity image for display.

Figure 2:
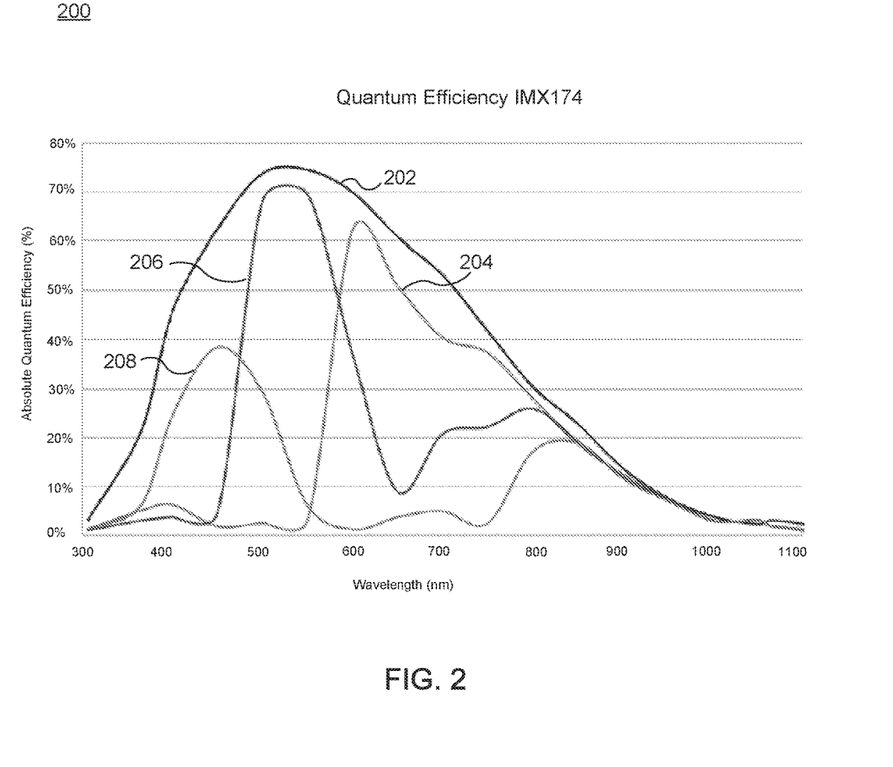
FIG. 2 is a graph modeling quantum efficiency when generating a monochrome image according to embodiments of the present technology.

FIG. 2 is a graph 200 showing quantum efficiency for a monochrome image compared to a color image based on the same data from a sensor. For example, the image data can be received from the sensor 110 using the color filter array 108 as shown in FIG. 1. The y-axis of the graph shows absolute quantum efficiency in terms of percentage. The x-axis of the graph shows the wavelength of light in nanometers (nm). Line 202 represents a monochrome image generated using techniques of the present technology based on image data received from an image capturing device using a color filter array. Line 204 represents red, line 206 represents green, and line 208 represents blue in a color image generated using the same image data used to generate the monochrome image represented by line 202. The graph 200 shows that the monochrome image generated using the techniques of the present technology has an increased quantum efficiency compared to the color image based on the same image data.

Figure 3:
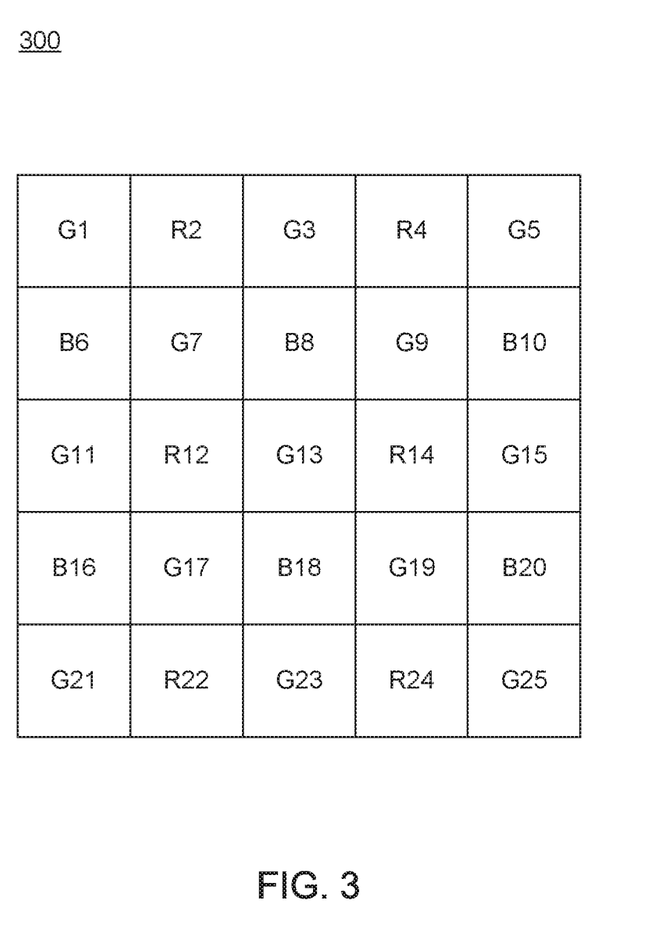
FIG. 3 is an illustration of a portion of an image stored in a Bayer color space that can be captured by an image sensor according to embodiments of the present technology.

FIG. 3 is a color filter array 300. The color filter array 300 can be employed in an image capturing device such as the image capturing device 112 with reference to FIG. 1. The color filter array 300 can be placed over a sensor or a grid of sensors in the image capturing device. The color filter array 108 can be employed to generate a color image when used in conjunction with monochrome sensors, such as sensor 110. In one aspect, the color filter array 300 is a Bayar filter. The color filter array 300 shows a color filter with 25 positions or locations arrayed in a 5×5 grid pattern. The letters RGB represent the three colors red, green, and blue while the numbers represent a position within the color filter array 300. The color filter array 300 is depicted with 13 of the 25 positions being green, 6 of the 25 positions being blue, and 6 of the 25 positions being red. Thus, the any given position on the color filter array has a dominant color to the exclusion of the other colors. Therefore, a color image generated by data gathered using the color filter array 300 will have a decrease in sharpness or MTF compared to a monochrome image generated with raw sensors data that does not have a color filter array. The present technology is employed to generate a monochrome image with an increased MTF using the image data gathered with the color filter array as compared to a color image generated using the same image data.

Figure 4:
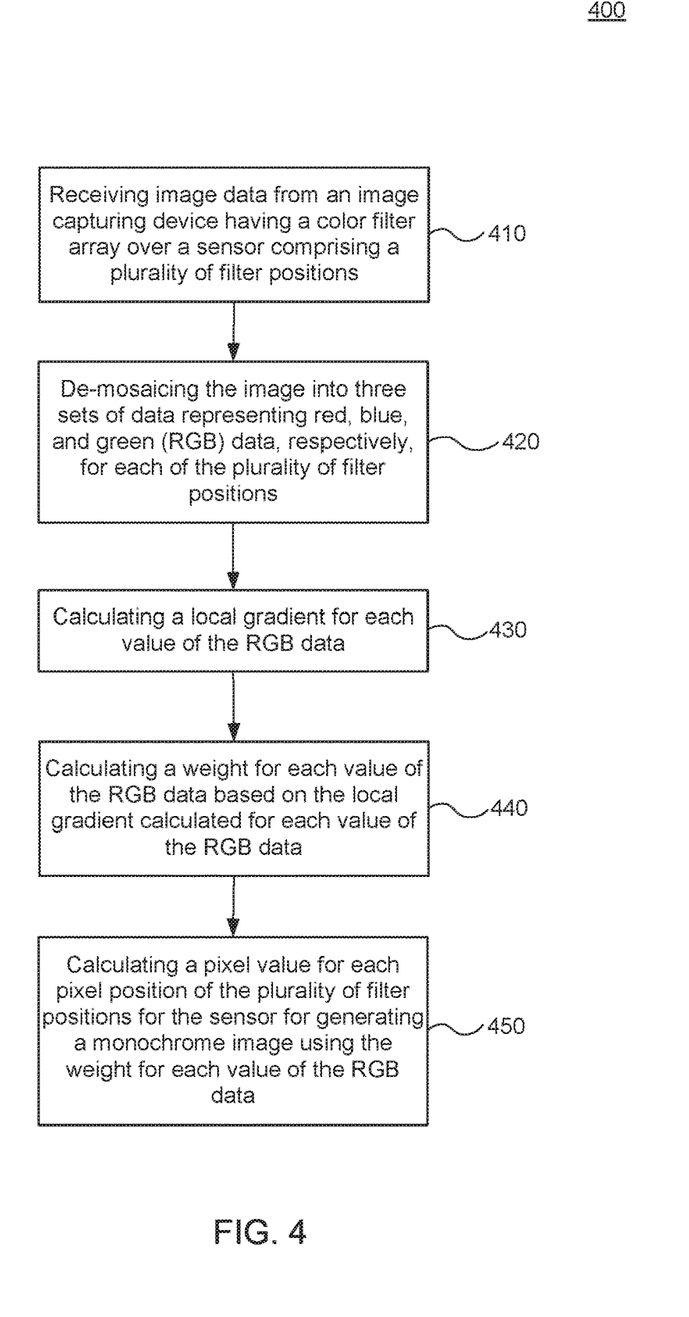
FIGS. 4 and 5 are flow chart diagrams illustrating an example of operations for generating a monochrome image from a color filter array according to embodiments of the present technology.

FIG. 4 is a flowchart of an example method 400 for generating a monochrome image from a color filter array according to an example of the present technology. The functionality 400 can be implemented as a method and executed as instructions on a machine, where the instructions are included on at least one computer readable medium or one non-transitory machine-readable storage medium. For example, and with reference to the system 100 of FIG. 1, starting in block 410, image data can be received from an image capturing device 112 having a color filter array 108 over the sensor 110 comprising a plurality of filter positions such as those shown in FIG. 3. The image capturing device 112 can optionally be operated without an IR filter and the image data can comprise data from an infrared spectrum. The method can optionally, via a processor 114, remove a black level from the image data. The image data can be processed by the processor 114 to calculate and apply a global gain to the image data for each of the plurality of filter positions. The global gain can be calculated by the processor 114 and applied to 99% of the image data.

The image data can be de-mosaiced by the processor 114 into three sets of data representing red, blue, and green (RGB) data, respectively, for each of the plurality of filter positions, as in block 420. A median operation can be performed by the processor 114 for each value of the RGB data for each filter position to calculate a spatial noise reduction. In other words, the RGB data may describe three color images and the median operation may be applied to each of the three color images separately. The median operation can comprise a 3×3 matrix performed over each value of the RGB data.

A local gradient can be calculated by the processor 114 for each value of the RGB data, as in block 430. A weight can be calculated by the processor 114 for each value of the RGB data based on the local gradient calculated for each value of the RGB data, as in block 440. The local gradient can be calculated by subtracting a maximum and a minimum value from each of the three sets of RGB data for each of the plurality of filter positions. The weight can be calculated for each value of the RGB data by dividing the local gradient by a total gradient. A pixel value can be calculated by the processor 114 for each pixel position of the plurality of filter positions for the sensor for generating a monochrome image using the weight for each value of the RGB data, as in block 450. The process 400 can then output the monochrome image to a display 116 based on the pixel value for each pixel position.

Figure 5:
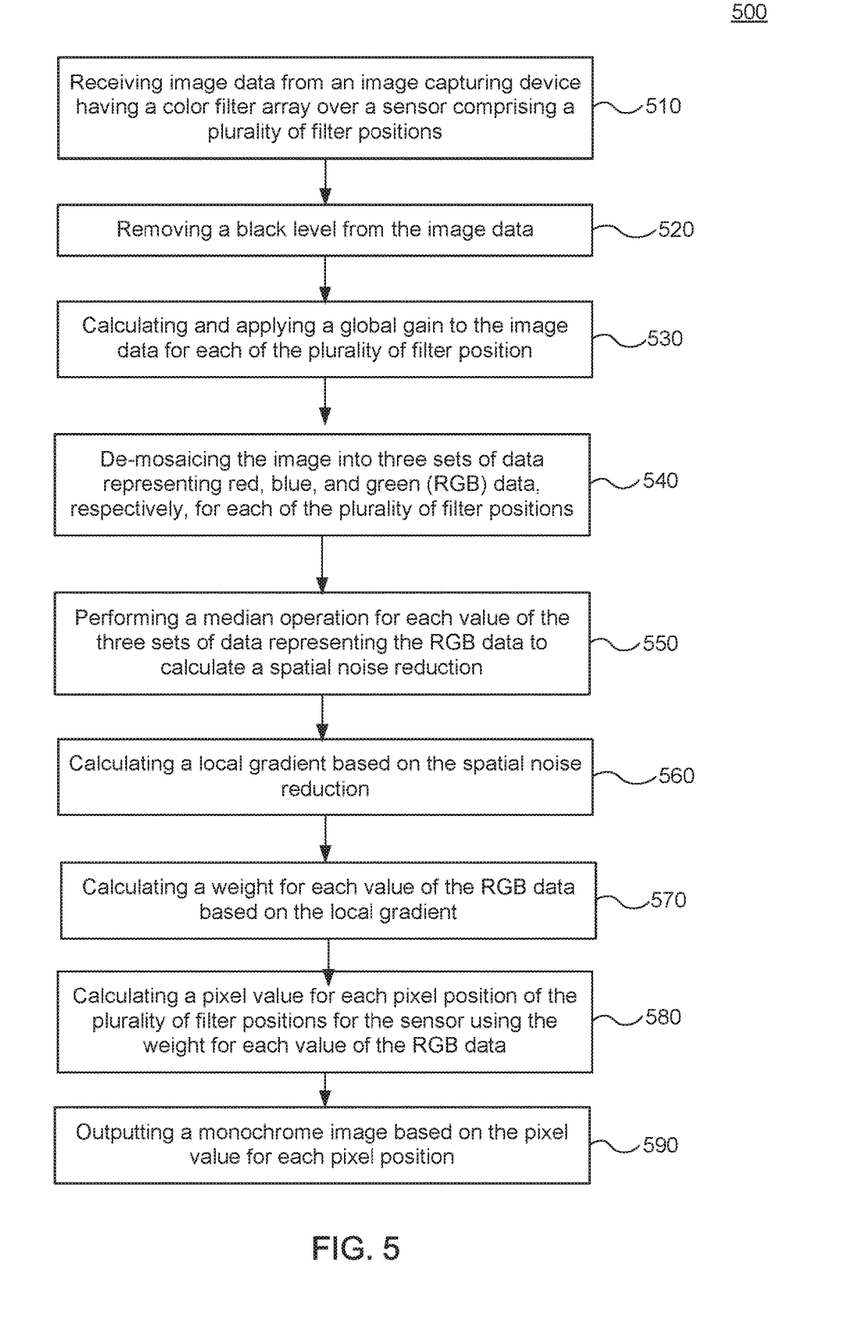

FIG. 5 is a flowchart of an example method 500 for generating a monochrome image from a color filter array according to an example of the present technology. The functionality 500 can be implemented as a method and executed as instructions on a machine, where the instructions are included on at least one computer readable medium or one non-transitory machine-readable storage medium. For example, and with reference to the system 100 of FIG. 1, starting in block 510, image data can be received from an image capturing device 112 having a color filter array 108 over the sensor 110 comprising a plurality of filter positions such as those shown in FIG. 3. In one aspect, the image capturing device 112 is operated without an IR filter and the image data further comprises data from an IR spectrum. A black level can be removed from the image data by a processor 114, as in block 520. In one aspect, a per color gain employed for white balancing may be bypassed. A global gain can be calculated by the processor 114 and applied to the image data for each of the plurality of filter positions, as in block 530. In one aspect, the global gain may be calculated and applied to 99% of the image data. For example, a small percentage of the sensor data for the brightest and darkest values may not be related to a scene being captured by the image capturing device 112. The small percentage can be defective pixels or glint from the sun that may be ignore. Applying the global gain to 99% of the image data may be a technique to ignore the image data that is not related to the scene being captured. However, once the global gain is calculated the global gain may be applied to all the data.

The image data can be de-mosaiced by the processor 114 into three sets of data representing red, blue, and green (RGB) data, respectively, for each of the plurality of filter positions, as in block 540. A median operation can be performed by the processor 114 for each value of the three sets of data representing the RGB data to calculate a spatial noise reduction, as in block 550. In one aspect, the median operation comprises a 3×3 matrix performed over each value of the RGB data. A local gradient can be calculated by the processor 114 based on the spatial noise reduction, as in block 560. In one aspect, the local gradient is calculated by subtracting a maximum and a minimum value from each of the three sets of data for each of the plurality of filter positions. A weight can be calculated by the processor 114 for each value of the RGB data based on the local gradient, as in block 570. A pixel value can be calculated by the processor 114 for each pixel position of the plurality of filter positions for the sensor using the weight for each value of the RGB data, as in block 580. In one aspect, the weight is calculated for each value of the RGB data by dividing the local gradient by a total gradient. A monochrome image can be output or displayed by a display 116 based on the pixel value for each pixel position, as in block 590.

Figure 6:
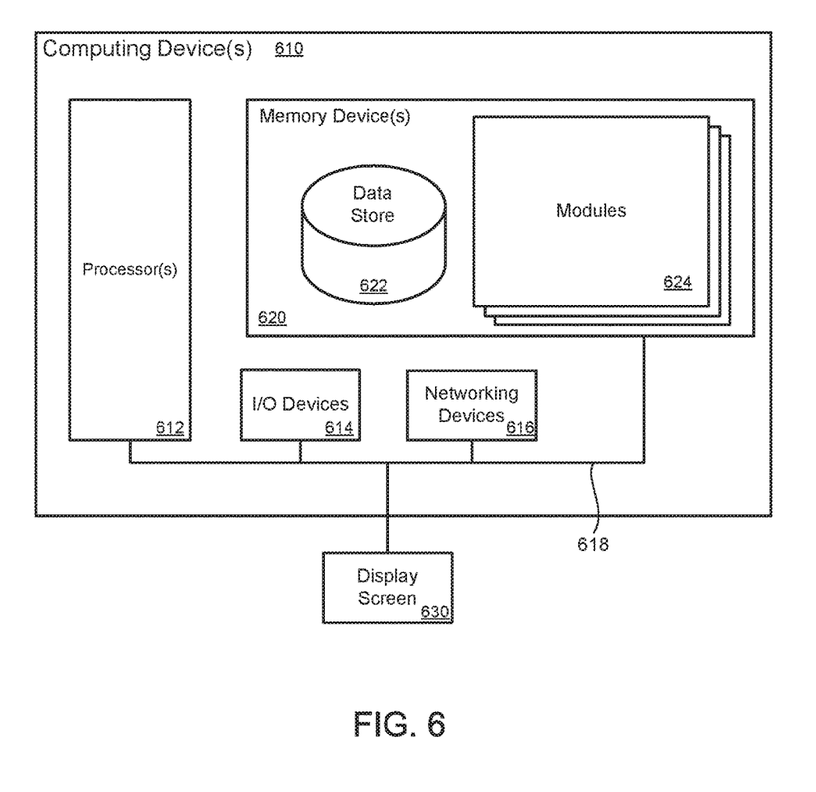
FIG. 6 is a block diagram that provides an example illustration of a computing device that can be employed in the present technology.

FIG. 6 illustrates a computing device 610 on which modules of this technology can execute. A computing device 610 is illustrated on which a high level example of the technology can be executed. The computing device 610 can include one or more processors 612 that are in communication with memory devices 620. For example, the processor 612 and the display screen 630 may be the processor 114 and the display 116 of FIG. 1 respectively. The computing device can include a local communication interface 618 for the components in the computing device 610. For example, the local communication interface 618 can be a local data bus and/or any related address or control busses as can be desired.

The memory device 620 can contain modules 624 that are executable by the processor(s) 612 and data for the modules 624. The modules 624 can execute the methods described above for generating a monochrome image from a color filter array. A data store 622 can also be available for storing code or data used by the modules 624.

Other applications can also be stored in the memory device 620 and can be executable by the processor(s) 612. Components or modules discussed in this description can be implemented in the form of software using high programming level languages that are compiled, interpreted or executed using a hybrid of the methods.

The computing device 610 can also have access to I/O (input/output) devices 614 that are usable by the computing device 610. An example of an I/O device 614 is a display screen 630 that is available to display output from the computing device 610. Other known I/O devices 614 can be used with the computing device 610 as desired. Networking devices 616 and similar communication devices can be included in the computing device 610. The networking devices 616 can be wired or wireless networking devices that connect to the Internet, a LAN, WAN, or other computing network.

The components or modules 624 that are shown as being stored in the memory device 620 can be executed by the processor 612. The term "executable" can mean a program file that is in a form that can be executed by a processor 612. For example, a program in a higher level language can be compiled into machine code in a format that can be loaded into a random access portion of the memory device 620 and executed by the processor 612, or source code can be loaded by another executable program and interpreted to generate instructions in a random access portion of the memory device 620 to be executed by the processor 612. The executable program can be stored in any portion or component of the memory device 620. For example, the memory device 620 can be random access memory (RAM), read only memory (ROM), flash memory, a solid-state drive, memory card, a hard drive, optical disk, floppy disk, magnetic tape, or any other memory components.

The processor 612 can represent multiple processors and the memory 620 can represent multiple memory units that operate in parallel to the processing circuits. This can provide parallel processing channels for the processes and data in the computing device 610. The local communication interface 618 can be used as a network to facilitate communication between any of the multiple processors and multiple memories. The local communication interface 618 can use additional systems designed for coordinating communication such as load balancing, bulk data transfer, and similar systems.

While the flowcharts presented for this technology can imply a specific order of execution, the order of execution can differ from what is illustrated. For example, the order of two more blocks can be rearranged relative to the order shown. Further, two or more blocks shown in succession can be executed in parallel or with partial parallelization. In some configurations, one or more blocks shown in the flow chart can be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more blocks of computer instructions, which can be organized as an object, procedure, or function. Nevertheless, the executables of an identified module need not be physically located together, but can comprise disparate instructions stored in different locations which comprise the module and achieve the stated purpose for the module when joined logically together.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices. The modules can be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein can also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method for generating a monochrome image from a color filter array, comprising:
   receiving image data from an image capturing device having a color filter array over a sensor comprising a plurality of filter positions;
   de-mosaicing the image data into three sets of data representing red, blue, and green (RGB) data, respectively, for each of the plurality of filter positions;
   calculating a local gradient for each value of the RGB data;
   calculating a weight for each value of the RGB data based on the local gradient calculated for each value of the RGB data; and
   calculating a pixel value for each pixel position of the plurality of filter positions for the sensor for generating a monochrome image using the weight for each value of the RGB data.

2. The method of claim 1, further comprising removing a black level from the image data.

3. The method of claim 1, further comprising calculating and applying a global gain to the image data for each of the plurality of filter positions.

4. The method of claim 3, wherein the global gain is calculated and applied to 99% of the image data.

5. The method of claim 1, further comprising performing a median operation for each value of the RGB data to calculate a spatial noise reduction.

6. The method of claim 5, wherein the median operation comprises a 3×3 matrix performed over each value of the RGB data.

7. The method of claim 1, further comprising outputting the monochrome image based on the pixel value for each pixel position.

8. The method of claim 1, wherein the image capturing device is operated without an infrared filter and the image data further comprises data from an infrared spectrum.

9. The method of claim 1, wherein calculating a local gradient comprises subtracting a maximum and a minimum value from each of the three sets of RGB data for each of the plurality of filter positions.

10. The method of claim 1, wherein the weight is calculated for each value of the RGB data by dividing the local gradient by a total gradient.

11. A method for generating a monochrome image from a color filter array, comprising:
    receiving image data from an image capturing device having a color filter array over a sensor comprising a plurality of filter positions;
    removing a black level from the image data;
    calculating and applying a global gain to the image data for each of the plurality of filter positions;
    de-mosaicing the image data into three sets of data representing red, blue, and green (RGB) data, respectively, for each of the plurality of filter positions;
    performing a median operation for each value of the three sets of data representing the RGB data to calculate a spatial noise reduction;
    calculating a local gradient based on the spatial noise reduction;
    calculating a weight for each value of the RGB data based on the local gradient;
    calculating a pixel value for each pixel position of the plurality of filter positions for the sensor using the weight for each value of the RGB data; and
    outputting a monochrome image based on the pixel value for each pixel position.

12. The method of claim 11, wherein the global gain is calculated and applied to 99% of the image data.

13. The method of claim 11, wherein the median operation comprises a 3×3 matrix performed over each value of the RGB data.

14. The method of claim 11, further comprising:
    bypassing a per color gain employed for white balancing.

15. The method of claim 11, wherein the image capturing device is operated without an infrared cut filter and the generating the image data further comprises data from an infrared spectrum.

16. The method of claim 11, wherein the local gradient is calculated by subtracting a maximum and a minimum value from each of the three sets of data for each of the plurality of filter positions.

17. The method of claim 11, wherein the weight is calculated for each value of the RGB data by dividing the local gradient by a total gradient.

18. A system for generating a monochrome image, comprising:
    an image capturing device with a color filter array, over a sensor, comprising red, blue, and green components arrayed in a plurality of filter positions, the image capturing device operable to generate image data associated with each of the plurality of filter positions;
    circuitry configured to:
      receive the image date from the image capturing device;
      de-mosaic the image data to de-mosaic the image data into three sets of data representing red, blue, and green (RGB) data, respectively, for each of the plurality of filter positions;
      calculate a local gradient for each value of the RGB data;

calculate a weight for each value of the RGB data based on the local gradient calculated for each value of the RGB data; and calculate a pixel value for each pixel position of the plurality of filter positions for the sensor for generating a monochrome image using the weight for each value of the RGB data.

19. The system of claim 18, further comprising:

a display configured to display the monochrome image based on the pixel value for each pixel position.

20. The system of claim 18, wherein the circuitry is physically coupled to the image capturing device.

21. The system of claim 18, wherein the circuitry is located remote compared to the image capturing device.

* * * * *